(12) United States Patent
Watanabe

(10) Patent No.: US 10,437,053 B2
(45) Date of Patent: Oct. 8, 2019

(54) PROJECTION DISPLAY DEVICE FOR VEHICLE

(71) Applicant: Yazaki Corporation, Minato-ku, Tokyo (JP)

(72) Inventor: Takeyoshi Watanabe, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/367,452

(22) Filed: Dec. 2, 2016

(65) Prior Publication Data

US 2017/0082854 A1    Mar. 23, 2017

Related U.S. Application Data

(63) Continuation of application No. PCT/JP2015/064013, filed on May 15, 2015.

(30) Foreign Application Priority Data

Jun. 3, 2014 (JP) .................................. 2014-114931
Jun. 3, 2014 (JP) .................................. 2014-114932

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/0025* (2013.01);
(Continued)

(58) Field of Classification Search
CPC ............ G02B 27/0101; G02B 27/0025; G02B 27/0149; G02B 27/01; G02B 27/017;
(Continued)

(56) References Cited

U.S. PATENT DOCUMENTS

| 3,940,204 A | 2/1976 | Withrington |
| 4,606,606 A * | 8/1986 | Freeman ............... G02B 27/017 359/471 |

(Continued)

FOREIGN PATENT DOCUMENTS

| CN | 101166289 A | 4/2008 |
| CN | 102745084 A | 10/2012 |

(Continued)

OTHER PUBLICATIONS

English Language Machine Translation of JP-H04-034126.*

(Continued)

*Primary Examiner* — Jason M Mandeville
(74) *Attorney, Agent, or Firm* — Banner & Witcoff, Ltd.

(57) ABSTRACT

A projection display device for a vehicle which allows visual recognition of a virtual image of a display image from a predetermined eye point, the device includes: a projection portion which projects light to be imaged as the display image on a display surface which is formed by a light reflection member in a windshield of a vehicle or in the vicinity of the windshield; an optical system which guides the light projected from the projection portion to the display surface; and an adjustment mechanism which adjusts the light before being introduced to the optical system so as to allow light derived from a curved image of which at least a part is curved to be introduced to the optical system.

5 Claims, 13 Drawing Sheets

(51) Int. Cl.
    *G02B 27/00*     (2006.01)
    *G09G 3/00*     (2006.01)

(52) U.S. Cl.
    CPC .... *G02B 27/0149* (2013.01); *B60K 2370/155* (2019.05); *B60K 2370/1529* (2019.05); *B60K 2370/1531* (2019.05); *B60K 2370/33* (2019.05); *B60K 2370/334* (2019.05); *G02B 2027/011* (2013.01); *G02B 2027/013* (2013.01); *G02B 2027/0159* (2013.01); *G02B 2027/0194* (2013.01); *G09G 3/002* (2013.01); *G09G 3/003* (2013.01)

(58) Field of Classification Search
    CPC .... G02B 2027/0118; G02B 2027/0183; G02B 2027/0159; G02B 2027/013; G02B 2027/0194; H01L 27/32; G09G 3/003; G09G 3/002; G09G 2320/0233; G09G 2320/0626; G09G 2360/14; G09G 2360/141; G09G 2360/144; G09G 2380/10; B60K 2350/1072; B60K 2350/2017; B60K 2350/203; B60K 2350/2052; B60R 2300/205
    USPC .................................. 345/7–9, 207, 214, 77
    See application file for complete search history.

(56) References Cited

U.S. PATENT DOCUMENTS

| | | | |
|---|---|---|---|
| 4,669,810 A | 6/1987 | Wood | |
| 4,763,990 A | 8/1988 | Wood | |
| 7,602,552 B1 | 10/2009 | Blumenfeld | |
| 8,766,879 B2 | 7/2014 | Fujikawa et al. | |
| 9,632,311 B2* | 4/2017 | Pasca ................. | G02B 27/0101 |
| 2008/0088527 A1 | 4/2008 | Fujimori et al. | |
| 2010/0073579 A1* | 3/2010 | Okada ................. | G02B 27/0101 |
| | | | 348/744 |
| 2012/0099032 A1* | 4/2012 | Ishikawa ............ | G02B 27/0101 |
| | | | 349/11 |
| 2013/0021224 A1 | 1/2013 | Fujikawa et al. | |
| 2013/0207946 A1* | 8/2013 | Kim ..................... | G09G 3/3225 |
| | | | 345/204 |
| 2013/0265262 A1* | 10/2013 | Jung ....................... | G06F 3/041 |
| | | | 345/173 |
| 2014/0176862 A1* | 6/2014 | Uehara ................... | G02B 6/06 |
| | | | 349/62 |
| 2015/0102980 A1* | 4/2015 | Pasca ................. | G02B 27/0101 |
| | | | 345/7 |

FOREIGN PATENT DOCUMENTS

| | | |
|---|---|---|
| CN | 102791510 A | 11/2012 |
| CN | 102902064 A | 1/2013 |
| JP | S60-198515 A | 10/1985 |
| JP | H04-034126 * | 3/1992 |
| JP | H04-034126 U | 3/1992 |
| JP | H05-065648 U | 8/1993 |
| JP | H05-341226 A | 12/1993 |
| JP | 2006-069473 A | 3/2006 |
| JP | 2008-102518 A | 5/2008 |
| JP | 2009-251194 A | 10/2009 |
| JP | 2010-224016 A | 10/2010 |
| JP | 2011-128500 A | 6/2011 |
| JP | 2013-025205 A | 2/2013 |
| RU | 2424541 C2 | 7/2011 |
| WO | 2012/128656 A1 | 9/2012 |

OTHER PUBLICATIONS

Jul. 28, 2015—International Search Report—Intl App PCT/JP2015/064013.
Jul. 28, 2015—(PCT) Written Opinion—App PCT/JP2015/064013.
Aug. 2, 2017—(CN) The First Office Action—App 201580029918.1.
Dec. 5, 2017—(JP) Notification of Reasons for Refusal—App 2014-114931.
Apr. 2, 2018—(CN) The Second Office Action—App 201580029918.1.
Sep. 3, 2018—(JP) The First Office Action—App 201710061123.X.
Apr. 22, 2019—(CN) The Second Office Action—App 201710061123.X.
Mar. 5, 2019—(JP) Notification of Reasons for Refusal—App 2015-111603.

* cited by examiner

PROJECTION DISPLAY DEVICE FOR VEHICLE

CROSS REFERENCE TO RELATED APPLICATIONS

This application is a continuation of PCT application No. PCT/JP2015/064013, which was filed on May 15, 2015 based on Japanese Patent Application (No. 2014-114931) and Japanese Patent Application (No. 2014-114932) both filed on Jun. 3, 2014, the contents of which are incorporated herein by reference.

BACKGROUND OF THE INVENTION

1. Field of the Invention

The present invention relates to a projection display device for a vehicle which performs display by using light reflection on a windshield (window glass) of a vehicle.

2. Description of the Related Art

For example, a general vehicular head-up display device (hereinafter, referred to as "HUD device") projects an image of light including various pieces of information to be displayed to a front windshield or combiner (reflection plate) in the vicinity of the front windshield, and forms an optical path so that the light reflected by the front windshield or the like is oriented in the viewpoint direction of a driver. Accordingly, while visually recognizing the scenery in front of the vehicle, the driver can visually recognize the image (hereinafter, referred to as "display image") which is projected from the HUD device that reflects the image to the front windshield or the like as a virtual image. In other words, while maintaining a usual driving state, the driver can visually recognize the display image by the HUD device without moving a line of sight.

However, in the device which projects the display image on a surface of the windshield or the like similar to the HUD device, there is a case where distortion is generated in the virtual image which is visually recognized by the driver. For example, examples of a reason for the distortion include the fact that the driver may view the display image projected to the surface of the windshield from an oblique direction, and the fact that the surface itself of the windshield may have a shape of a smoothly curved surface. Furthermore, since a curvature at each location on the windshield or an inclination angle with respect to a horizontal surface (or perpendicular surface) varies, there are cases where various distortions are generated in the virtual image in accordance with this situation. Additionally, in a case where the display image is projected using an enlargement optical system, there is a case where distortion is generated due to the curved surface shape of a lens and a mirror included in the enlargement optical system. The distortion negatively influences visibility of the display image.

Usually, in such distortion (aberration), three-dimensional distortion of the display image (virtual image) caused by "image surface curvature" is one of the main reasons for deterioration of the visibility of the display image.

Since the distortion of the three-dimensional display image is reduced, the HUD device (hereinafter, referred to as "device in the related art") described in PTL 1 projects the laser light emitted from a laser module onto a screen which is provided in the middle of the optical system of the HUD device and is curved in a predetermined shape, before projecting the laser light to the windshield or the like. After this, the light emitted (reflected) from the image (curved image) projected to the screen is projected to the windshield via a recessed surface mirror or the like. In this manner, the device in the related art corrects the image surface curvature of the virtual image by once forming the curved image on the curved screen.

PTL 1 is JP-A-2013-25205.

As described above, the device in the related art reduces the three-dimensional distortion of the display image (virtual image) caused by the "image surface curvature" which is generated due to the characteristics of the windshield or the like, by employing the screen having a certain shape in the middle (on the optical path) of the optical system of the HUD device.

SUMMARY OF THE INVENTION

However, in the device in the related art, since the light is scattered when the light is reflected by the surface of the screen and the light amount transmitted to the downstream side of the optical path is reduced, the utilization efficiency of the light is not excellent. Furthermore, in a case where external light, such as sunlight, is incident on the screen, there is a possibility that the visibility of the display image may deteriorate due to the external light.

Considering the above-described situation, an object of the present invention is to provide a projection display device for vehicle which can reduce image surface curvature generated due to a shape of a windshield or the like and an optical system of an HUD device without providing the screen having a certain shape on the optical path, and which can improve the visibility of the display image.

In order to achieve the above-described object, a projection display device for vehicle according to the present invention has the following characteristics (1) to (11).

(1) A projection display device for a vehicle which allows visual recognition of a virtual image of a display image from a predetermined eye point, the device including: a projection portion which projects light to be imaged as the display image on a display surface which is formed by a light reflection member in a windshield of a vehicle or in the vicinity of the windshield; an optical system which guides the light projected from the projection portion to the display surface; and an adjustment mechanism which adjusts the light before being introduced to the optical system so as to allow light derived from a curved image of which at least a part is curved to be introduced to the optical system.

(2) The projection display device for the vehicle according to the above-described (1), in which the adjustment mechanism includes a thin plate-like or a sheet-like flexible display device which is a part of the projection portion and has flexibility, and a shape holding member which holds a shape of the flexible display device in a state where at least a part of the flexible display device is curved, and in which the flexible display device forms the curved image and introduces the light emitted from the curved image to the optical system.

(3) The projection display device for the vehicle according to the above-described (2), in which the shape holding member includes a base substrate which supports the flexible display device and has a surface curved in a predetermined shape.

(4) The projection display device for the vehicle according to the above-described (3), in which the flexible display device sticks to the surface of the base substrate and is fixed to have the shape curved along the surface.

(5) The projection display device for the vehicle according to the above-described (4), in which the flexible display device is fixed to have the shape curved along the surface of the base substrate by filler that fills a space between the flexible display device and the base substrate and is solidified.

(6) The projection display device for the vehicle according to the above-described (2), in which the shape holding member includes a movable support mechanism which abuts against a part of the flexible display device and is capable of changing the curved state of the flexible display device according to movement of the movable support mechanism.

(7) The projection display device for the vehicle according to any one of the above-described (2) to (6), in which the flexible display device has a shape which corrects aberration related to an image surface curvature which is caused by characteristics of at least one of the optical system and the display surface and is generated in the virtual image.

(8) The projection display device for the vehicle according to any one of the above-described (2) to (7), further including: an optical correction member which is disposed on a downstream side of an optical path of the flexible display device, and has a lens surface curved in a shape different from the flexible display device.

(9) The projection display device for the vehicle according to the above-described (1), in which the adjustment mechanism includes an intermediate image forming optical member which is capable of forming an intermediate image having a shape of which at least a part is curved, by using the light projected from the projection portion, in which the intermediate image forming optical member forms the intermediate image as the curved image, and introduces the light emitted from the intermediate image to the optical system.

(10) The projection display device for the vehicle according to the above-described (9), in which the intermediate image forming optical member forms the intermediate image having a shape which corrects the aberration related to the image surface curvature which is caused by characteristics of at least one of the optical system and the display surface and is generated in the virtual image.

(11) The projection display device for the vehicle according to the above-described (9), in which the intermediate image forming optical member includes at least one of an optical lens, a Fresnel lens, and a microlens array.

According to the projection display device for the vehicle with the configuration of the above-described (1), since the light which is adjusted to be the light derived from the curved image of which at least apart is curved is introduced to the optical system, by adjusting the shape of the curved image considering the image surface curvature which is generated due to the shape or the like of the windshield, it is possible to correct the image surface curvature. Furthermore, since it is not necessary to use the screen unlike the device in the related art, without deterioration of utilization efficiency of the light, deterioration of visibility of the display image caused by external light is also avoided.

According to the projection display device for the vehicle with the configuration of the above-described (2), since the surface of the flexible display device is curved, the image (curved image) formed based on the shape is introduced to the optical system. Accordingly, it is possible to correct the aberration of the image surface curvature.

According to the projection display device for the vehicle with the configuration of the above-described (3), it is possible to form the curved shape of the flexible display device in advance in a shape necessary for the correction of the image surface curvature.

According to the projection display device for the vehicle with the configuration of the above-described (4), it is possible to fix the curved shape of the flexible display device in a desired shape just by simple sticking work.

According to the projection display device for the vehicle with the configuration of the above-described (5), it is possible to fix the shape in a state where the flexible display device is curved in a desired curved shape.

According to the projection display device for the vehicle with the configuration of the above-described (6), by moving the movable support mechanism, it is possible to adjust the curved shape of the flexible display device as necessary. Accordingly, for example, it is possible to adjust the curved shape in accordance with the actual surface shape of the windshield of the vehicle, and to correct the aberration of the image surface curvature.

According to the projection display device for the vehicle with the configuration of the above-described (7), since the curved state of the flexible display device is determined considering the image surface curvature caused by the shape or the like of the windshield of the vehicle, the image surface curvature is effectively reduced, and visibility of the display image is improved.

According to the projection display device for the vehicle with the configuration of the above-described (8), it is possible to correct the aberration of the image surface curvature with high accuracy. In other words, the flexible display device is flexible, but when the shape is curved, there is a certain restriction or limit, and a curve which is similar to a shape of a spherical surface, is not possible in some case. Here, by combining the optical correction member which is curved in a shape different from that of the flexible display device, and the flexible display device, it is possible to correct various image surface curvatures.

According to the projection display device for the vehicle with the configuration of the above-described (9), the intermediate image forming optical member forms the intermediate image (curved image) of which at least a part is curved, and the light derived from the intermediate image is introduced to the optical system. Accordingly, it is possible to correct the aberration of the image surface curvature.

According to the projection display device for the vehicle with the configuration of the above-described (10), since the shape of the intermediate image is determined considering the image surface curvature caused by the shape or the like of the windshield of the vehicle, the image surface curvature is effectively reduced, and the visibility of the display image is improved.

According to the projection display device for the vehicle with the configuration of the above-described (11), without deterioration of the light transmission efficiency, it is possible to deliver the light emitted from the intermediate image to the optical system. Accordingly, it is possible to improve the utilization efficiency of the light.

According to the projection display device for the vehicle of the present invention, without using a special screen unlike the device in the related art, it is possible to reduce the "image surface curvature" generated due to the shape or the like of the windshield and the optical system of the HUD device, and to improve the visibility of the display image.

Above, the present invention is briefly described. Furthermore, by reading through the aspects (hereinafter, referred to as "embodiments") for carrying out the invention which will be described in the following with reference to the attached drawings, specific details of the present invention will become more apparent.

DETAILED DESCRIPTION OF THE EXEMPLARY EMBODIMENTS (First Embodiment)

A first embodiment related to a projection display device for vehicle of the present invention will be described in the following with reference to each drawing.

<Basic Configuration Example of Projection Display Device for Vehicle>

Figure 1:
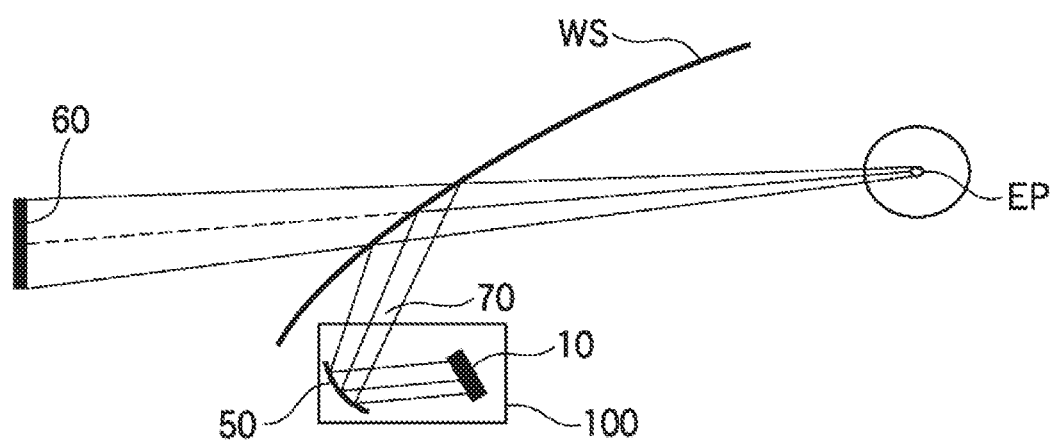
FIG. 1 is a longitudinal sectional view illustrating a positional relationship between each element in a case where a vehicle on which a HUD unit is loaded is viewed from a side.

A positional relationship of each element in a case where a vehicle on which the projection display device for the vehicle (hereinafter, referred to as "HUD device 100") according to the embodiment is loaded is viewed from a side, is illustrated in FIG. 1.

The HUD device 100 illustrated in FIG. 1 is accommodated on the inner side of a dashboard of a vehicle, and is configured to be capable of emitting light including a display image upward from an opening portion 70 formed at a part on an upper surface of the dashboard.

On the inside of the HUD device 100, a display device 10, a recessed surface mirror 50, and a display control portion which is not illustrated, are provided. The display device 10 has a display surface which can display an arbitrary two-dimensional image. In a case of a general display device, the display surface thereof is a flat surface, but as will be described later, in the display device 10 of the embodiment, a surface 10a (that is, display surface) is held in a curved shape.

On the display surface of the display device 10, the information which helps the driving in the vehicle, for example, character information, such as a value of car speed or "km/h", is displayed as necessary. As illustrated in FIG. 1, the light including the two-dimensional display image displayed on the display surface of the display device 10 is emitted from the display device 10 and is oriented toward the recessed surface mirror 50, and is reflected by a surface of the recessed surface mirror 50 and is emitted from the opening portion 70. The light emitted from the opening portion 70 is reflected by the surface of a windshield WS, and is oriented toward an eye point EP. Accordingly, at a position of the eye point EP, a driver can visually recognize the display image projected by the HUD device 100. Practically, the driver visually recognizes a virtual image 60 displayed at a predetermined position farther than the windshield WS. Since the recessed surface mirror 50 has optical magnification, the projection can be performed in a state where the display image to be visually recognized by the driver is enlarged.

In addition, in the example of FIG. 1, the light emitted by the HUD device 100 is reflected by the surface of the windshield WS, but instead of the windshield WS, an optical reflection member which is called a combiner or a half mirror, may be used.

<Description of Optical Path>

Figure 2:
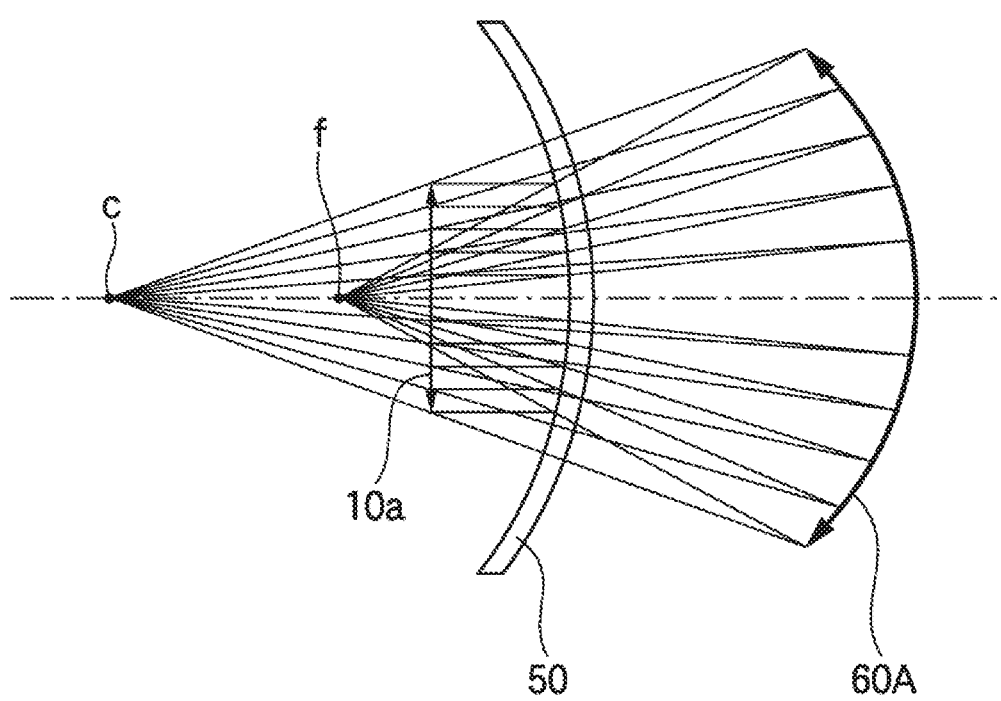
FIG. 2 is an optical path view illustrating an optical path in a case where a surface of a display device is a flat surface in the projection display device for the vehicle illustrated in FIG. 1.

An optical path in a case where the surface 10a of the display device 10 in the projection display device for the vehicle illustrated in FIG. 1 is flat, is illustrated in FIG. 2. Meanwhile, an optical path in a case where the surface 10a of the display device 10 is curved, is illustrated in FIG. 3.

Figure 3:
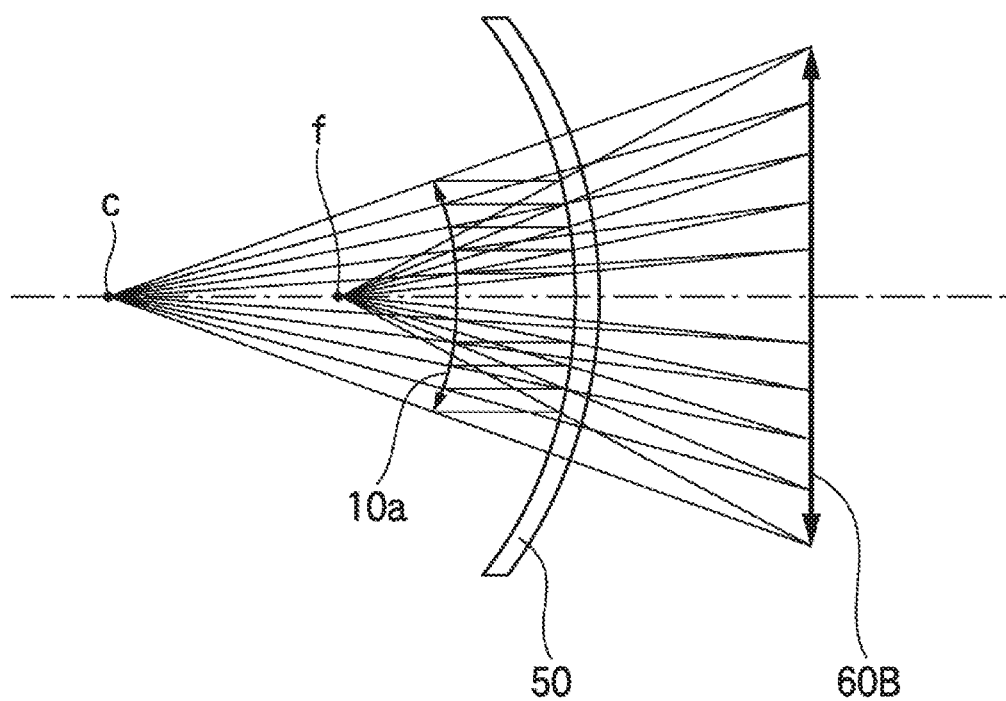
FIG. 3 is an optical path view illustrating an optical path in a case where the surface of the display device is curved in the projection display device for the vehicle illustrated in FIG. 1.

In FIGS. 2 and 3, a point f indicates a focal point of the recessed surface mirror 50, and a point c indicates a spherical center of the recessed surface mirror 50. In addition, in FIGS. 2 and 3, in order to make it easy to understand of a principal of the present invention, a case where the recessed surface mirror 50 has a simple radius of curvature is considered.

In a case where the surface 10a of the display device 10 is flat, as illustrated in FIG. 2, since the influence of the shape (curved surface shape) of a reflection surface of the recessed surface mirror 50 is received, a virtual image 60A forms an image on the curved surface. Therefore, an image surface curvature is generated when the driver views the virtual image 60A, and distortion with respect to the depth direction of an optical axis is generated.

Meanwhile, in FIG. 3, the influence of the curved surface shape of the reflection surface of the recessed surface mirror 50 is corrected, and the shape of the surface 10a of the display device 10 is curved. Therefore, as illustrated in FIG. 3, a virtual image 60B forms the image on a plane, and the image surface curvature is not generated when the driver views the virtual image 60B. Accordingly, even in a case where the recessed surface mirror 50 is used in the optical system, without receiving the influence, it is possible to improve the visibility of the display image.

In FIGS. 2 and 3, only the influence of the recessed surface mirror 50 is illustrated, but practically, since the surface of the windshield WS is generally a curved surface, there is also a case where the image surface curvature similar to FIG. 2 is generated due to the influence of the curved surface of the windshield WS.

Therefore, regarding the shape of the surface 10a of the display device 10, it is necessary to determine the curved shape considering both the influence of the recessed surface mirror 50 and the influence of the windshield WS. Accordingly, as illustrated in FIG. 3, the virtual image 60B which does not have an image surface curvature is obtained.

<Description of Display Device 10 and Related Elements>

As illustrated in FIG. 3, a configuration example for realizing the display device 10 having the curved surface 10a, will be described in the following.

CONFIGURATION EXAMPLE 1

Figure 4A:
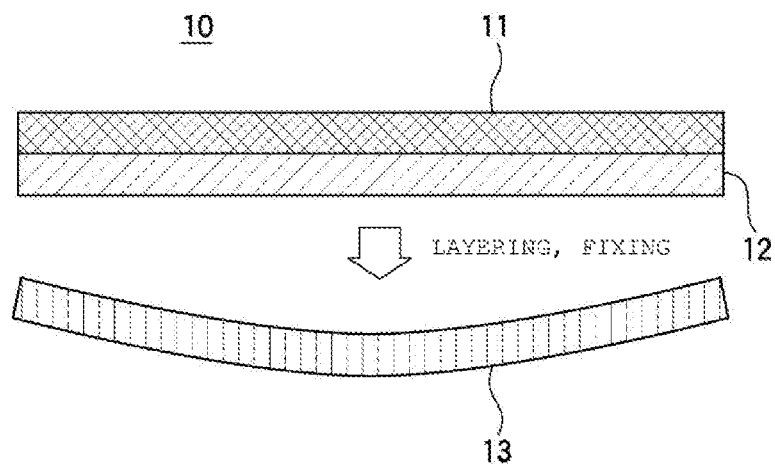
FIGS. 4A and 4B are longitudinal sectional views illustrating a configuration of the display device in the thickness direction in "Configuration Example 1", and each illustrates a state before integrating a plurality of elements and after the integration.
Figure 4B:
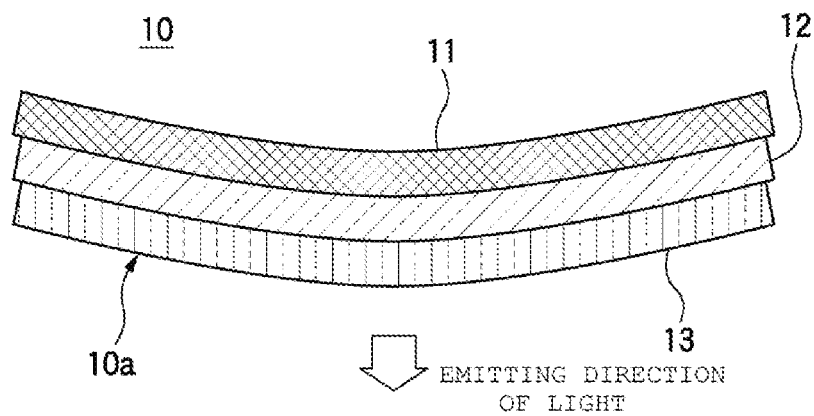

FIGS. 4A and 4B are longitudinal sectional views illustrating a configuration of the display device 10 in the thickness direction in "Configuration Example 1", and each drawing illustrates a state before integrating a plurality of elements and after the integration. In addition, in order to make it easy to understand the structure, in FIGS. 4A and 4B, the thickness direction is illustrated to be enlarged from a real size. The practical display device 10 has a sheet-like or thin plate-like shape in which the thickness is approximately from 1 mm to several mm.

The display device 10 illustrated in FIGS. 4A and 4B is configured of an organic EL display element layer 11, a flexible transparent resin substrate 12, and a transparent base substrate 13. The organic EL display element layer 11 and the flexible transparent resin substrate 12 are a so-called flexible display device, and have flexibility. Furthermore, in the embodiment, the display device 10 configured of the organic EL display element layer 11 and the flexible transparent resin substrate 12 will be described, but it is possible to employ a display device as long as the display device has flexibility not being limited to the above-described display device 10.

In the organic EL display element layer 11, multiple fine organic EL display elements are formed in the longitudinal direction (horizontal direction of FIGS. 4A and 4B) and in the lateral direction (depth direction of FIGS. 4A and 4B) at a constant interval. Although not being illustrated, each organic EL display element is configured of a sealing layer, a negative pole, an organic semiconductor, a positive pole, a driving circuit, and a transistor (TFT) similar to a general organic EL display element.

Since the organic EL display element layer 11 is formed on the flexible transparent resin substrate 12, the organic EL display element layer 11 can have flexibility and be curved as necessary. In addition, in the embodiment, as illustrated in FIG. 4B, in order to realize the display device 10 in which the shape is fixed in a curved state, the hard transparent base substrate 13 is integrated.

The transparent base substrate 13 is processed in advance in a certain curved shape necessary for correcting the image surface curvature by the curved surface shape of the reflection surface of the recessed surface mirror 50 illustrated in FIG. 1 and the surface shape of the windshield WS. As illustrated in FIG. 4A, by layering the organic EL display element layer 11 and the flexible transparent resin substrate 12 on the transparent base substrate 13, and by fixing (for example, adhering) the surfaces to each other in a tightly adhered state, the entire display device 10 is formed in a curved shape as illustrated in FIG. 4B.

Therefore, by loading the display device 10 illustrated in FIG. 4B on the HUD device 100 illustrated in FIG. 1, it is possible to obtain the virtual image 60B which does not have the image surface curvature as illustrated in FIG. 3.

In addition, in the configuration example of FIGS. 4A and 4B, the transparent base substrate 13 is configured of a transparent material since the transparent base substrate 13 is in the emitting direction of the light, but in a case where the transparent base substrate 13 is disposed on the opposite side, the transparent base substrate 13 may be configured of an opaque material.

CONFIGURATION EXAMPLE 2

Figure 5A:
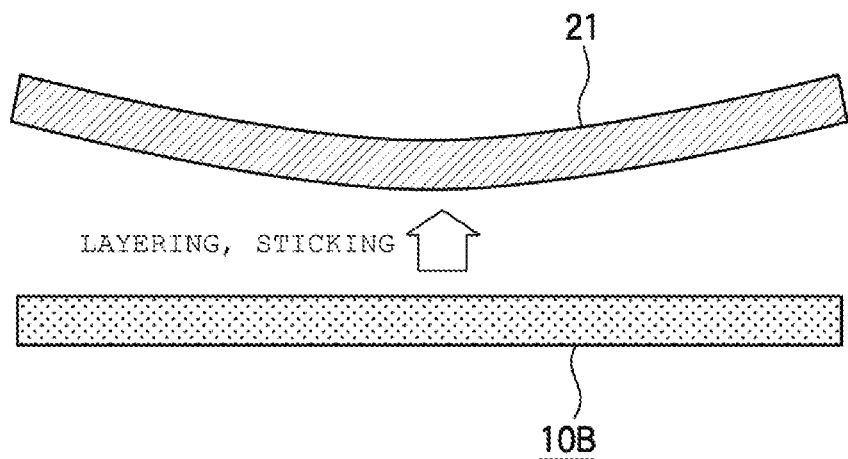
FIGS. 5A and 5B are longitudinal sectional views illustrating a configuration of a display device in "Configuration Example 2" and a support member thereof in the thickness direction, and each illustrates a state before integrating a plurality of elements and after the integration.
Figure 5B:
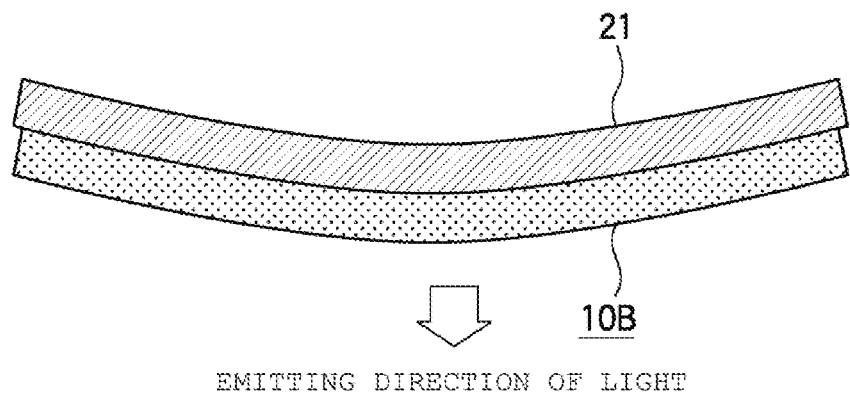

FIGS. 5A and 5B are longitudinal sectional views illustrating a configuration of a display device 10B in "Configuration Example 2" and a support member thereof in the thickness direction, and each drawing illustrates a state before integrating a plurality of elements and after the integration.

The display device 10B illustrated in FIGS. 5A and 5B is a so-called flexible display device, and has flexibility. On the display device 10B, multiple fine organic EL display elements are formed in the longitudinal direction (horizontal direction of FIGS. 5A and 5B) and in the lateral direction (depth direction of FIGS. 5A and 5B) at a constant interval. Although not being illustrated, each organic EL display element is configured of a sealing layer, a negative pole, an organic semiconductor, a positive pole, a driving circuit, and a transistor (TFT) similar to a general organic EL display element.

In the embodiment, in order to hold the shape of the display device 10B in a curved state as illustrated in FIG. 4B, a curved surface-like support member 21 is used. The surface shape of the curved surface-like support member 21 is molded in a shape determined in advance. In other words, the curved surface-like support member 21 is molded in the curved surface shape of the reflection surface of the recessed surface mirror 50 illustrated in FIG. 1 or in a shape necessary for correcting the aberration of the image surface curvature due to the curved surface shape of the windshield WS.

As illustrated in FIG. 5A, in a state where the display device 10B is layered and tightly adheres to the surface of the curved surface-like support member 21, the display device 10B is fixed by sticking and adhering. Accordingly, as illustrated in FIG. 5B, in a curved state, it is possible to hold the shape of the display device 10B.

Therefore, by loading the display device 10B illustrated in FIG. 5B on the HUD device 100 illustrated in FIG. 1, it is possible to obtain the virtual image 60B which does not have the image surface curvature as illustrated in FIG. 3.

In addition, in the configuration example of FIGS. 5A and 5B, since the curved surface-like support member 21 is on the side opposite to the emitting direction of the light, the curved surface-like support member 21 is configured of an opaque material, but in a case where the curved surface-like support member 21 is disposed in the emitting direction of the light, it is necessary to configure the curved surface-like support member 21 by an transparent material.

CONFIGURATION EXAMPLE 3

Figure 6:
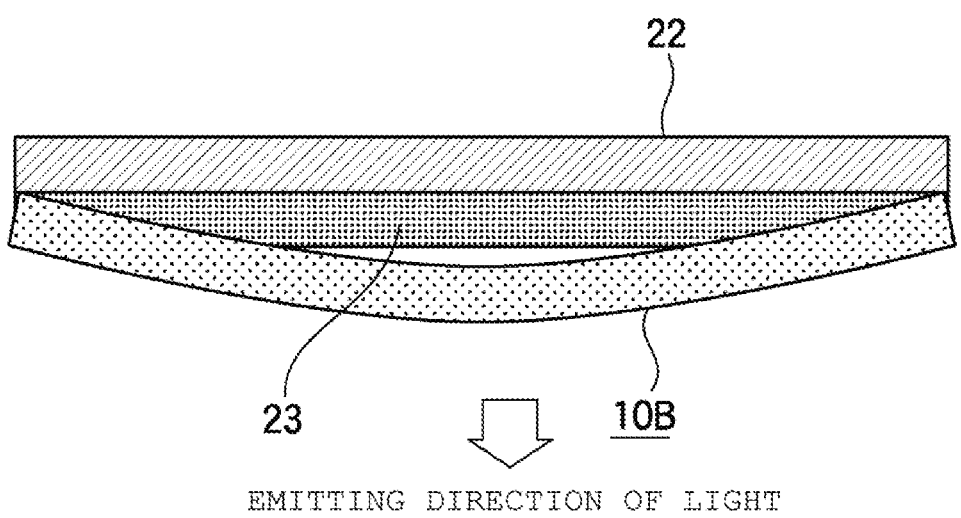
FIG. 6 is a longitudinal sectional view illustrating a configuration of a display device in "Configuration Example 3" and a support member thereof in the thickness direction.

FIG. 6 is a longitudinal sectional view illustrating a configuration of the display device in "Configuration Example 3" and the support member thereof in the thickness direction.

The display device 10B illustrated in FIG. 6 is a so-called flexible display device, and has flexibility. On the display device 10B, multiple fine organic EL display elements are formed in the longitudinal direction (horizontal direction of FIG. 6) and in the lateral direction (depth direction of FIG. 6) at a constant interval. Although not being illustrated, each organic EL display element is configured of a sealing layer, a negative pole, an organic semiconductor, a positive pole, a driving circuit, and a transistor (TFT) similar to a general organic EL display element.

In the embodiment, in order to hold the shape of the display device 10B in a curved state, a support member 22 and filler 23 are used. In other words, when fixing the display device 10B onto the plane-like support member 22, the display device 10B is curved to have the shape determined in advance, and the space of a void between the display device 10B and the support member 22 is filled with the filler 23. As the filler 23 is solidified, as illustrated in FIG. 6, the shape of the display device 10B is fixed, and the display device 10B is fixed onto the support member 22.

The curved shape of the display device 10B in a state where the shape is fixed, is molded to match the curved surface shape of the reflection surface of the recessed surface mirror 50 illustrated in FIG. 1 or a shape necessary for correcting the aberration of the image surface curvature due to the curved surface shape of the windshield WS.

Therefore, by loading the display device 10B illustrated in FIG. 6 on the HUD device 100 illustrated in FIG. 1, it is possible to obtain the virtual image 60B which does not have the image surface curvature as illustrated in FIG. 3.

In addition, in the configuration example of FIG. 6, since the support member 22 and the filler 23 are on the side opposite to the emitting direction of the light, the support member 22 and the filler 23 are configured of an opaque material, but in a case where the support member 22 and the filler 23 are disposed in the emitting direction of the light, it is necessary to configure the support member 22 and the filler 23 by a transparent material.

CONFIGURATION EXAMPLE 4

Figure 7:
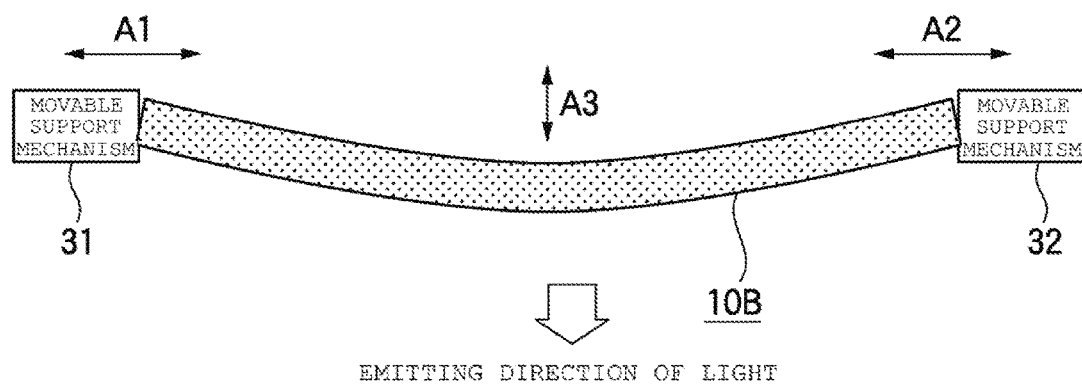
FIG. 7 is a longitudinal sectional view illustrating a configuration of a display device in "Configuration Example 4" and a support member thereof in the thickness direction.

FIG. 7 is a longitudinal sectional view illustrating a configuration of the display device in "Configuration Example 4" and the support member thereof in the thickness direction.

As illustrated in FIG. 7, both side end portions of the display device 10B are respectively supported by movable support mechanisms 31 and 32 in "Configuration Example 4". The movable support mechanism 31 is configured to be movable in the A1 direction, and the movable support mechanism 32 is configured to be movable in the A2 direction.

Therefore, by moving the movable support mechanisms 31 and 32, it is possible to set the distance between the movable support mechanisms 31 and 32 to make the mechanisms approach and be separated from each other. By moving the mechanisms, the bent state of the display device 10B changes, and the center part of the display device 10B moves in the A3 direction.

In other words, when the movable support mechanism 31 and the movable support mechanism 32 approach each other, the shape of the display device 10B is largely curved, and when the movable support mechanism 31 and the movable support mechanism 32 are separated from each other, the curvature of the display device 10B decreases. Accordingly, it is possible to adjust the shape of the display device 10B to be in a desired shape.

Therefore, in the HUD device 100 illustrated in FIG. 1, by adjusting the curved shape of the display device 10B illustrated in FIG. 7 in accordance with the shape of the recessed surface mirror 50 and the shape of the windshield WS, it is possible to correct the aberration of the image surface curvature, and to improve the display quality of the virtual image 60.

CONFIGURATION EXAMPLE 5

Figure 8:
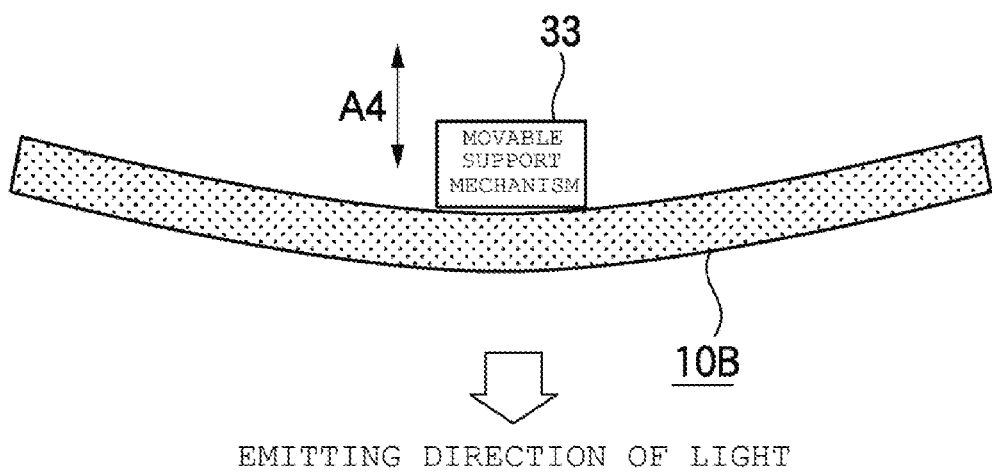
FIG. 8 is a longitudinal sectional view illustrating a configuration of a display device in "Configuration Example 5" and a support member thereof in the thickness direction.

FIG. 8 is a longitudinal sectional view illustrating a configuration of the display device in "Configuration Example 5" and the support member thereof in the thickness direction.

As illustrated in FIG. 8, in "Configuration Example 5", the vicinity of the center of the display device 10B is supported by a movable support mechanism 33. In addition, both side end portions of the display device 10B is supported not to be moved in the thickness direction. The movable support mechanism 33 is configured to be movable in the A4 direction.

Therefore, by moving the movable support mechanism 33 in the A4 direction, the center part of the display device 10B moves in the thickness direction (A4 direction). Accordingly, it is possible to adjust the shape of the display device 10B to be in a desired curved shape.

Therefore, in the HUD device 100 illustrated in FIG. 1, by adjusting the curved shape of the display device 10B of FIG. 8 in accordance with the shape of the recessed surface mirror 50 and the shape of the windshield WS, it is possible to correct the aberration of the image surface curvature, and to improve the display quality of the virtual image 60.

CONFIGURATION EXAMPLE 6

Figure 9:
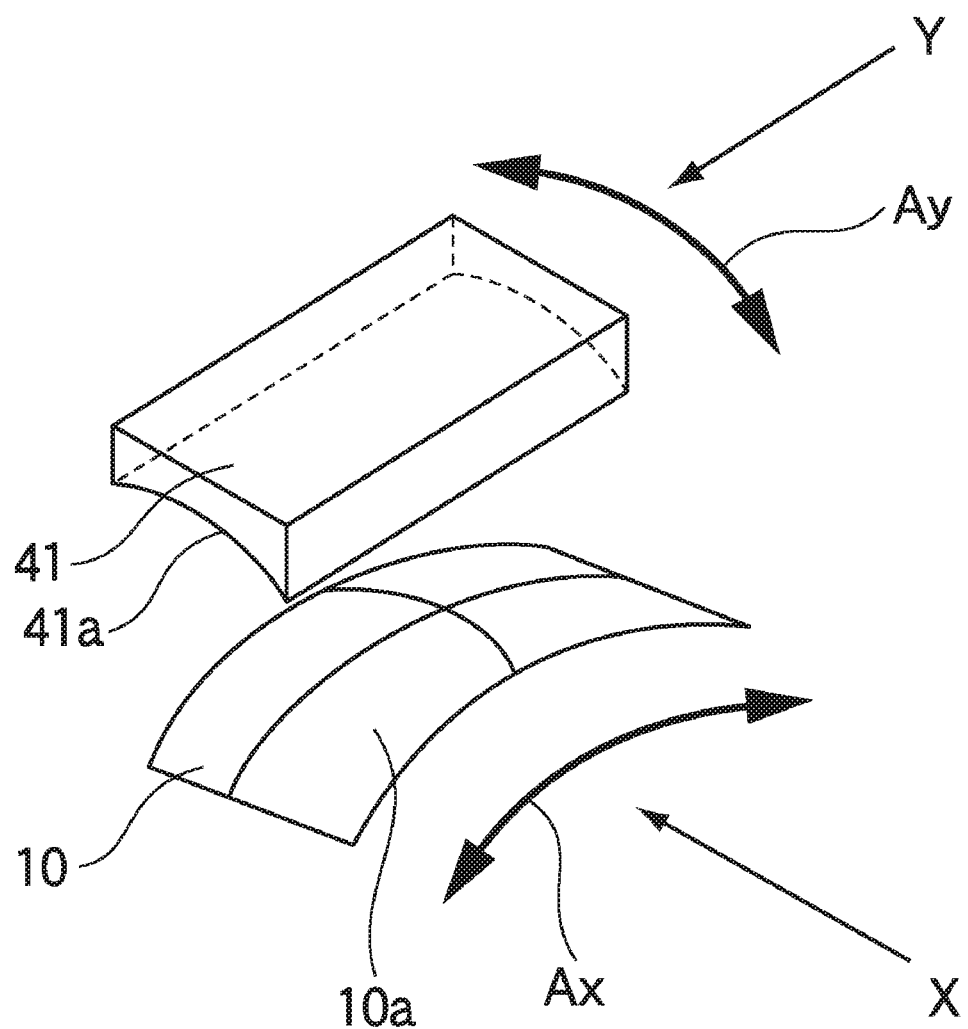
FIG. 9 is a perspective view illustrating a display device in "Configuration Example 6" and an optical correction member thereof.

FIG. 9 is a perspective view illustrating the display device 10 in "Configuration Example 6" and an optical correction member 41.

As illustrated in FIG. 9, in "Configuration Example 6", the optical correction member 41 is disposed on the downstream side (emitting direction of the light) of the optical path of the display device 10 having a curved shape. In addition, the display device 10 is curved in a shape in which the center part protrudes compared to a periphery portion in the longitudinal direction along the direction Ax that circulates around a shaft X. In addition, the optical correction member 41 is an optical correcting lens having a curved surface 41a having the surface shape along the direction Ay that circulates around a shaft Y. The shaft X and the shaft Y have directions different from each other, and for example, are disposed in a positional relationship in which the shafts are orthogonal to each other.

In general, the flexible display device can change the shape comparatively freely similar to a paper sheet. However, since there is a certain restriction or limit in distortion allowed by the flexible display device, for example, there is a case where it is difficult to perform the molding in a shape of a spherical surface.

Meanwhile, since there are many cases where the shape of the reflection surface of the recessed surface mirror 50 or the surface of the windshield WS has a spherical surface or a complicated three-dimensional shape, there is a case where it is not possible to sufficiently respond to the shapes only by changing the shape of the display device 10.

In "Configuration Example 6" of FIG. 9, the display device 10 curved along the direction Ax and the optical correction member 41 having the surface curved along the direction Ay, are used being combined with each other. Therefore, it is possible to correct the image surface curvature generated due to the recessed surface mirror 50 having a spherical surface or a complicated three-dimensional shape, or the windshield WS, with high accuracy.

(Second Embodiment)

Next, a second embodiment related to the projection display device for the vehicle of the present invention will be described in the following with reference to each drawing.

<Basic Configuration Example of Projection Display Device for Vehicle>

Figure 10:
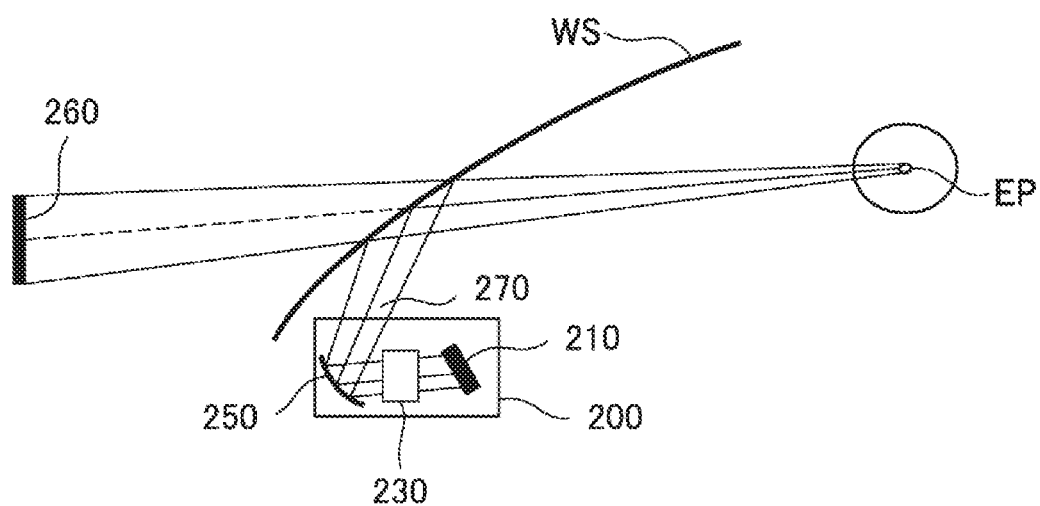
FIG. 10 is a longitudinal sectional view illustrating a positional relationship of each element when the vehicle on which the HUD unit is loaded is viewed from a side.

A positional relationship of each element in a case where the vehicle on which the projection display device for the vehicle (hereinafter, referred to as "HUD device 200") according to the embodiment is loaded is viewed from a side, is illustrated in FIG. 10.

The HUD device 200 illustrated in FIG. 10 is accommodated on the inner side of the dashboard of the vehicle, and is configured to be capable of emitting the light including the display image upward from an opening portion 270 formed at a part on the upper surface of the dashboard.

On the inside of the HUD device 200, a display device 210, a recessed surface mirror 250, an intermediate image forming optical member 230, and a display control portion which is not illustrated, are provided. The display device 210 has a display surface which can display an arbitrary two-dimensional image. The display surface of the display device 210 in the embodiment (second embodiment) is a flat surface. The intermediate image forming optical member 230 is a member which can form an intermediate image (curved image) having a shape of which at least a part is curved, by using the light projected from the display device 210, and will be described in detail later.

On the display surface of the display device 210, the information which helps the driving in the vehicle, for example, character information, such as a value of car speed or "km/h", is displayed as necessary. As illustrated in FIG. 10, the light including the two-dimensional display image displayed on the display surface of the display device 210 is emitted from the display device 210, and after passing through the intermediate image forming optical member 230, the light is reflected by the surface of the recessed surface mirror 250, and is emitted from the opening portion 270. The light emitted from the opening portion 270 is reflected by the surface of a windshield WS, and is oriented toward the eye point EP. Therefore, at a position of the eye point EP, the driver can visually recognize the display image projected by the HUD device 200. Practically, the driver visually recognizes a virtual image 260 displayed at a predetermined position farther than the windshield WS. Since the recessed surface mirror 250 has optical magnification, the projection can be performed in a state where the display image to be visually recognized by the driver enlarged is enlarged.

In addition, in the example of FIG. 10, the light emitted by the HUD device 200 is reflected by the surface of the windshield WS, but instead of the windshield WS, an optical reflection member which is called a combiner or a half mirror, may be used.

<Description of Optical Path>

Figure 11:
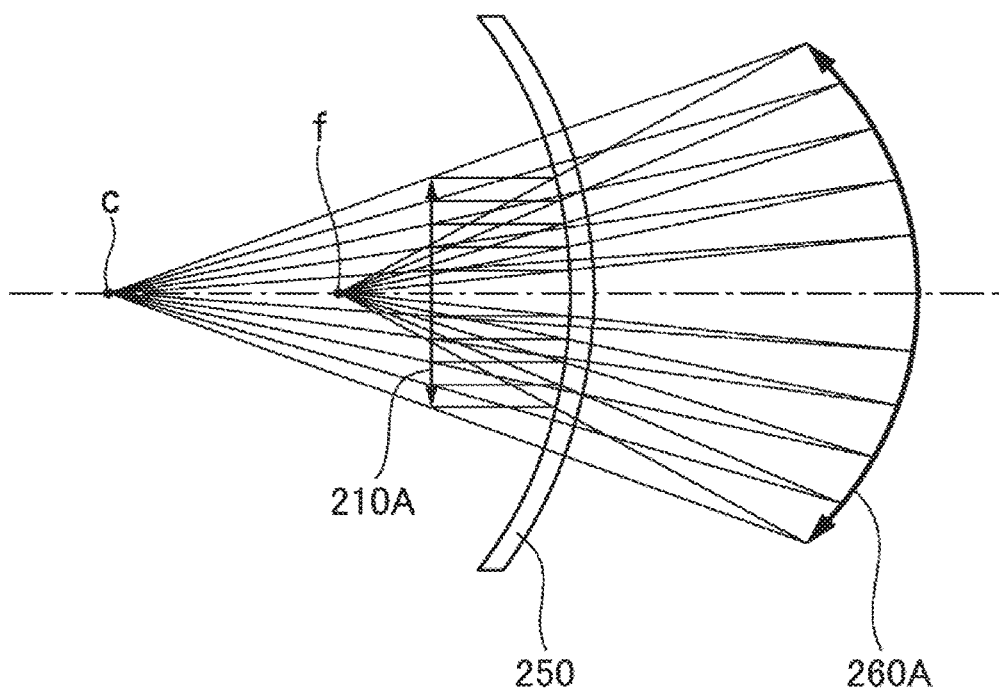
FIG. 11 is an optical path view illustrating an optical path in a case where the surface of the display device is a flat surface in the projection display device for the vehicle illustrated in FIG. 10.

An optical path in a case where the intermediate image forming optical member 230 is not present in the projection display device for the vehicle illustrated in FIG. 10, is illustrated in FIG. 11. In a case of FIG. 11, similar to a case illustrated in FIG. 2, since the image is displayed on a screen having a shape of a plane of the display device 210, is displayed, a display image 210A is formed on a two-dimensional plane.

Figure 12:
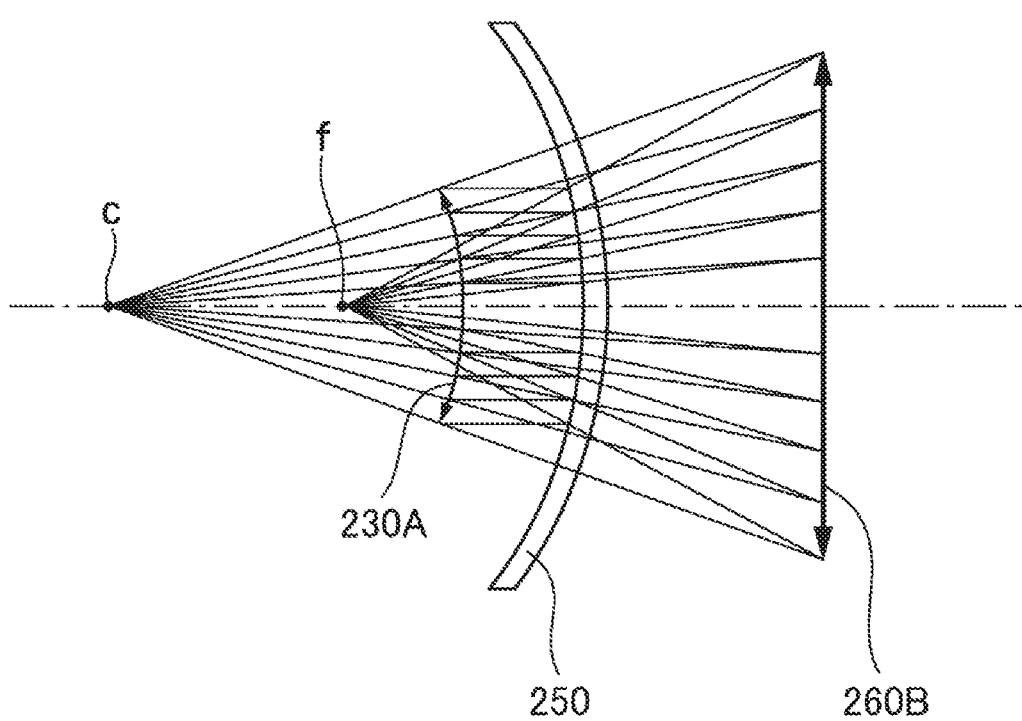
FIG. 12 is an optical path view illustrating an optical path in a case where the surface of the display device is curved in the projection display device for the vehicle illustrated in FIG. 10.

Meanwhile, the optical path in a case where intermediate image forming optical member 230 is present (that is, a case of the second embodiment), is illustrated in FIG. 12. In a case of FIG. 12, as will be described later, since the intermediate image forming optical member 230 forms the curved intermediate image (curve image), similar to a case illustrated in FIG. 3, the display image 230A (that is, intermediate image) introduced to the optical system (recessed surface mirror 250) is placed in a curved state.

In FIGS. 11 and 12, a point f indicates a focal point of the recessed surface mirror 250, and a point c indicates a spherical center of the recessed surface mirror 250. In addition, in FIGS. 11 and 12, in order to make it easy to understand of a principal of the present invention, a case where the recessed surface mirror 250 has a simple radius of curvature is considered.

In a case where the intermediate image forming optical member 230 is not present, as illustrated in FIG. 11, since the influence of the shape (curved surface shape) of the reflection surface of the recessed surface mirror 250 is received, a virtual image 260A forms the image on the curved surface. Therefore, the image surface curvature is generated when the driver views the virtual image 260A, and distortion with respect to the depth direction of the optical axis is generated.

Meanwhile, in FIG. 12, since the intermediate image forming optical member 230 forms the curved intermediate image, the shape of the display image (intermediate image) 230A which is released from the intermediate image (curved image) and introduced to the optical system (recessed surface mirror 250), is curved. Therefore, as illustrated in FIG. 12, a virtual image 260B is formed on a plane, and the image surface curvature is not generated when the driver views the virtual image 260B. Accordingly, even in a case where the recessed surface mirror 250 is used in the optical system, without receiving the influence, it is possible to improve the visibility of the display image.

In FIGS. 11 and 12, only the influence of the recessed surface mirror 250 is illustrated, but practically, since the surface of the windshield WS is generally a curved surface, there is also a case where the image surface curvature similar to FIG. 11 is generated due to the influence of the curved surface of the windshield WS.

Therefore, regarding the shape of the intermediate image (curved image) formed by the intermediate image forming optical member 230, it is necessary to determine the curved shape considering both the influence of the recessed surface mirror 250 and the influence of the windshield WS. Accordingly, as illustrated in FIG. 12, the virtual image 260B which does not have the image surface curvature is obtained.

<Configuration of Projection Display Device for Vehicle of Embodiment>

Figure 13:
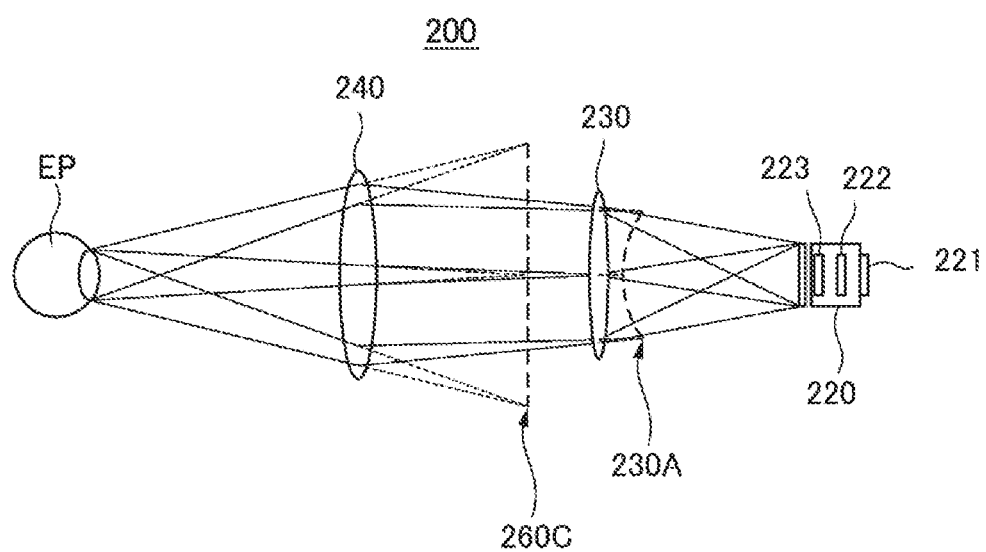
FIG. 13 is an optical path view illustrating a configuration and an optical path of the projection display device for the vehicle of the embodiment.

The configuration and the optical path of the HUD device 200 is illustrated in detail in FIG. 13. Regarding the HUD device 200 of FIG. 13, for convenience of description, a part of the configuration illustrated in FIG. 10 is changed as follows.

In other words, in the HUD device 200, a projector 220 is used as an element that corresponds to the display device 210. In addition, the intermediate image forming optical member 230 is disposed on the downstream side of the optical path of the projector 220. In addition, an optical system 240 illustrated in FIG. 13 corresponds to the recessed surface mirror 250 of FIG. 10.

The projector 220 is provided with a light source 221, a display device 222, and a projection lens 223. In the example of FIG. 13, a case where the display device 222 is a transparent type liquid crystal display device is considered, but it is possible to use various types of display devices similar to a general projector. For example, a reflection type device, such as a liquid crystal on silicon (LCOS) and a digital micromirror device (DMD), may be used, and it is possible to configure the projector by a scanner in which a micro electro mechanical systems (MEMS) is used. As the light source, an LED or a laser light source is used as necessary.

In the example of FIG. 13, when illumination light emitted from the light source 221 penetrates the display device 222, intensity or the like is modulated in accordance with the two-dimensional display image displayed in the display device 222, and the illumination light is incident on the projection lens 223 as the light including the information of the display image.

The light projected from the projection lens 223 of the projector 220 is introduced to the intermediate image forming optical member 230. The intermediate image forming optical member 230 is configured of an optical lens, a Fresnel lens, a microlens array, and a reflection mirror, and forms the intermediate image 230A having a shape (curved shape illustrated in FIG. 12) of which at least a part is curved by using the light projected from the projection lens 223. In addition, the light emitted from the intermediate image 230A is introduced to the optical system 240.

The optical system 240 transmits the light of the intermediate image 230A which is incident via the intermediate image forming optical member 230 toward the windshield WS as illustrated in FIG. 10, and forms the display image on the windshield WS. At the eye point EP, the display image is visually recognized as a virtual image 260C displayed to be farther than the windshield WS.

Even in the configuration of FIG. 13, by the influence of the curved surface of the optical system 240 (recessed surface mirror 250) and the windshield WS, there is a possibility that the aberration of the image surface curvature is generated in the virtual image 260C. However, in the HUD device 200 of FIG. 13, the intermediate image 230A forms an image in a curved shape, and by this shape, it is possible to obtain an effect of correcting the image surface curvature to offset the influence of the curved surface of the recessed surface mirror 250 and the windshield WS. Therefore, the virtual image 260C of FIG. 13 is formed on a plane similar to the virtual image 260B of FIG. 12, and the generation of the image surface curvature is suppressed.

In addition, in the HUD device 200 of FIG. 13, since the intermediate image forming optical member 230 introduces the light emitted from the intermediate image 230A to the optical system 240 side as it is without using the screen or the like of the device in the related art, it is possible to more effectively transmit the light. Accordingly, it is possible to reduce light emission intensity required for the light source 221 of the display device 210 (projector 220), and this leads to the reduction of power consumption and heat generation.

In addition, since the HUD device 200 illustrated in FIG. 13 does not use the screen unlike the device in the related art for forming the intermediate image 230A, it is possible to prevent the external light, such as sunlight, from being scattered, and accordingly, the visibility of the virtual image 260C is improved.

Here, the characteristics of the embodiments of the projection display device for the vehicle according to the above-described present invention will be listed briefly summarizing the characteristics in the following (1) to (11).

(1) A projection display device for vehicle (100 of the first embodiment or 200 of the second embodiment) (HUD device 100) which allows visual recognition of a virtual image of a display image from a predetermined eye point (EP), including: a projection portion (display device 10) which projects light that forms an image which is the display image on a display surface on which a light reflection member is formed in a windshield (WS) of a vehicle or in the vicinity of the windshield; an optical system (recessed surface mirror 50) which guides the light projected from the projection portion to the display surface; and an adjustment mechanism (display device 10 of the first embodiment or the intermediate image forming optical member 230 of the second embodiment) which adjusts the light before being introduced to the optical system so as to allow the light derived from a curved image of which at least a part is curved to be introduced to the optical system.

(2) The projection display device for the vehicle (HUD device 100) according to the above-described (1), in which the adjustment mechanism includes a thin plate-like or a sheet-like flexible display device (display devices 11 and 12 of FIGS. 4A and 4B) which is a part of the projection portion (10) and has flexibility, and a shape holding member (transparent base substrate 13 of FIGS. 4A and 4B) which holds a shape of the flexible display device in a state where at least a part of the flexible display device is curved, and in which the flexible display device forms the curved image and introduces the light emitted from the curved image to the optical system (50).

(3) The projection display device for the vehicle according to the above-described (2), in which the shape holding member (refer to FIG. 4) includes abase substrate (13) which supports the flexible display device (11) and has a surface curved in a predetermined shape.

(4) The projection display device for the vehicle according to the above-described (3), in which the flexible display device (10B of FIGS. 5A and 5B) sticks to the surface of the base substrate (curved surface-like support member 21 of FIGS. 5A and 5B) and is fixed to have the shape curved along the surface.

(5) The projection display device for the vehicle according to the above-described (4), in which the flexible display device (10B of FIG. 6) is fixed to have the shape curved along the surface of the base substrate by filler (23 of FIG. 6) that fills the space between the flexible display device and the base substrate (support member 22 of FIG. 6) and is solidified.

(6) The projection display device for the vehicle according to above-described (2), in which the shape holding member includes a movable support mechanism (31 and 32 of FIG. 7, 33 of FIG. 8) which abuts against a part of the flexible display device and is capable of changing the curved state of the flexible display device (10B of FIGS. 7 and 8) according to movement of the movable support mechanism.

(7) The projection display device for the vehicle according to any one of the above-described (2) to (6), in which the flexible display device (10B of FIGS. 7 and 8) has a shape which corrects aberration related to an image surface curvature which is caused by characteristics of at least one of the optical system and the display surface and is generated in the virtual image.

(8) The projection display device for the vehicle according to the any one of above-described (2) to (7), further including: an optical correction member (41 of FIG. 9) which is disposed on a downstream side of an optical path of the flexible display device, and has a lens surface curved in a shape different from that of the flexible display device.

(9) The projection display device for the vehicle (HUD device 200) according to above-described (1), in which the adjustment mechanism includes an intermediate image forming optical member (230) which is capable of forming an intermediate image (230A) having a shape of which at least a part is curved, by using the light projected from the projection portion (the display device 210, specifically, the projector 220), in which the intermediate image forming optical member forms the intermediate image which is the curved image, and introduces the light emitted from the intermediate image to the optical system (240, specifically, the recessed surface mirror 250).

(10) The projection display device for the vehicle according to the above-described (9), in which the intermediate image forming optical member (230) forms the intermediate image having a shape which corrects the aberration related to the image surface curvature which is caused by characteristics of at least one of the optical system and the display surface and is generated in the virtual image.

(11) The projection display device for the vehicle according to the above-described (9), in which the intermediate image forming optical member (230) includes at least one of an optical lens, a Fresnel lens, and a microlens array.

The present invention is described with reference to the detailed and specific embodiments, but it is apparent for those skilled in the art that it is possible to add various changes or corrections without departing from the spirit and the scope of the invention.

According to the present invention, it is possible to reduce the image surface curvature generated due to the shape of the windshield or the like and the optical system of the HUD device without using a special screen, and to improve visibility of the display image. The present invention that achieves the effects is useful in the projection display device for the vehicle which performs the display using the light reflection on the windshield or the like of the vehicle.

What is claimed is:

1. A projection display device for a vehicle which allows visual recognition of a virtual image of a display image from a predetermined eye point, the device comprising:
    a projection portion which projects light to be imaged as the display image on a display surface which is formed by a light reflection member in a windshield of a vehicle or in the vicinity of the windshield, a flexible display device being used in the projection portion;
    an optical system which guides the light projected from the projection portion to the display surface, the optical system including a recessed surface mirror provided in front of the projection portion; and
    an adjustment mechanism which corrects distortion of the image by the recessed surface mirror and adjusts the light before being introduced to the optical system so as to allow light derived from a curved image of which at least a part is curved to be introduced to the optical system,
    wherein the adjustment mechanism includes:
        a thin plate-like or a sheet-like flexible display element which is a part of the projection portion and has flexibility; and
        a shape holding member comprising a non-flexible curved base substrate separately formed from the flexible display element, the flexible display element being layered on the base substrate so that the shape holding member holds a shape of the flexible display element in a state where at least a part of the flexible display element is curved.

2. The projection display device for the vehicle according to claim 1,
    wherein the flexible display device forms the curved image and introduces the light emitted from the curved image to the optical system.

3. The projection display device for the vehicle according to claim 2,
    wherein the adjustment mechanism further includes a flexible transparent substrate separately formed from the display element and the base substrate, the flexible transparent substrate being layered between the base substrate and the display element.

4. The projection display device for the vehicle according to claim 2,
    wherein the flexible display device has a shape which corrects aberration related to an image surface curvature which is caused by characteristics of at least one of the optical system and the display surface and is generated in the virtual image.

5. The projection display device for the vehicle according to claim 2, further comprising:
    an optical correction member which is disposed on a downstream side of an optical path of the flexible display device, and has a lens surface curved in a shape different from the flexible display device.

* * * * *